June 28, 1966 T. PROCTOR ET AL 3,258,537

FREQUENCY MODULATION SUM AND DIFFERENCE STEREO HAVING PRE-DETECTION COMPENSATING MEANS

Filed Nov. 16, 1961 2 Sheets-Sheet 1

INVENTORS.
THOMAS PROCTOR
NEA-YEA WOO
BY W. J. Shanley Jr.
ATTORNEY

United States Patent Office 3,258,537

Patented June 28, 1966

3,258,537

FREQUENCY MODULATION SUM AND DIFFERENCE STEREO HAVING PRE-DETECTION COMPENSATING MEANS

Thomas Proctor, Webster, and Nea-Yea Woo, Rochester, N.Y., assignors to General Dynamics Corporation, Rochester, N.Y., a corporation of Delaware Filed Nov. 16, 1961, Ser. No. 152,825
7 Claims. (Cl. 179—15)

Figure 1B:
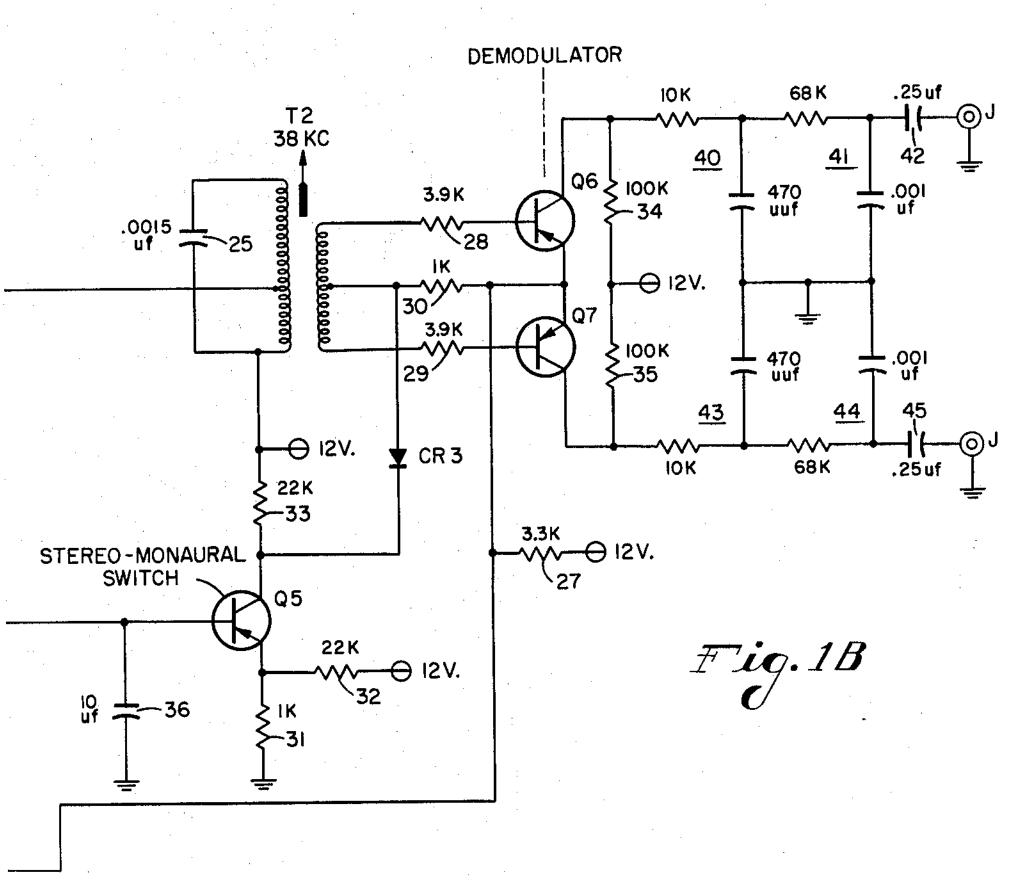

This invention relates to multiplex communication receivers and, more particularly, to a multiplex receiver for reception of FM signals which are broadcast in accordance with the FCC approved FM stereo multiplex system.

It is an object of our invention to provide a simple and compact unit for demodulating FM stereo multiplex signals of the type approved by the FCC. In accordance with the approved FCC system, the main carrier is frequency modulated with the summation signal, a 19 kc. pilot subcarrier signal and a double sideband suppressed carrier modulated by the difference signal. Thus, in the absence of a stereo broadcast, the conventional receiver will receive the monaural information which is being transmitted instead of the composite signal. However, when the station starts transmitting stereo information, the operator is normally given an indication of this fact and he thereafter switches the receiver to its stereo mode of operation. Such a system is undesirable since it requires constant monitoring by the person listening to the receiver and, in addition, the manual switching necessary to accomplish the change mode of operation unduly complicates the receiver. On the other hand, there are systems which provide for the automatic control of the mode of operation. However, such systems are unduly complicated and consequently unduly expensive.

It is, therefore, an object of our invention to provide a stereo-monaural broadcast receiver in which its mode of operation is automatically controlled by the signal broadcast. This has been accomplished in accordance with our invention without any significant increase in the complexity or the cost of the receiver.

When stereo information is broadcast in accordance with the FCC approved system, upon its reception it is necessary to adjust the level of the difference signal with respect to the summation signal in order to accomplish an accurate reproduction of the relative levels of the summation and the difference channels upon their transmission. This difference in level must be compensated for in the receiver by raising the level of the difference signal modulated on the subcarrier by a factor of $\pi/2$ with respect to the summation signal. Stated another way, the transfer characteristic of the receiver must have a value of $\pi/2$ at 38 kc. normalized at 1 kc. This factor is inherent in the FCC system as is fully explained in an article by Carl G. Eilers appearing on page 20 of the August 1961, issue of "Audio." It suffices here to say, without going into the details of the mathematical analysis of the FCC approved system, that the difference signal which is used to modulate the 38 kc. subcarrier at the transmitter loses some of its energy upon the filtering of the signal being broadcast to prevent the radiation of signals above 53 kc. This loss must be compensated for at the receiver by amplifying the difference signal more than the summation signal. This must be accomplished without introducing a time delay of one signal with respect to the other signal which would introduce distortion.

It is, therefore, an object of our invention to compensate for the difference in levels between the summation and the difference signals without introducing distortion into the channel carrying the sum and the difference signals due to a variation in time delay in the channel of one signal with respect to the other.

It is an object of our invention to provide inexpensive and simple means for adjusting the level of the difference signal with respect to the summation signal without introducing distortion into these signals.

It is a further object of our invention to dispense with the necessity for separating the summation signal from the AM modulated subcarrier prior to the demodulation of the subcarrier thus dispensing with the necessity of using a bandpass filter to separate the subcarrier modulation from the summation signal.

Thus, in accordance with our invention, it is not necessary to adjust the time delay of two channels over their band of frequencies at which they are operating at so as to provide the same time delay for each channel.

These and other objects of our invention will become more apparent as this description proceeds and the features of novelty which characterize our invention will be pointed out with particularity in the claims annexed to and forming a part of this specification.

Figure 2:
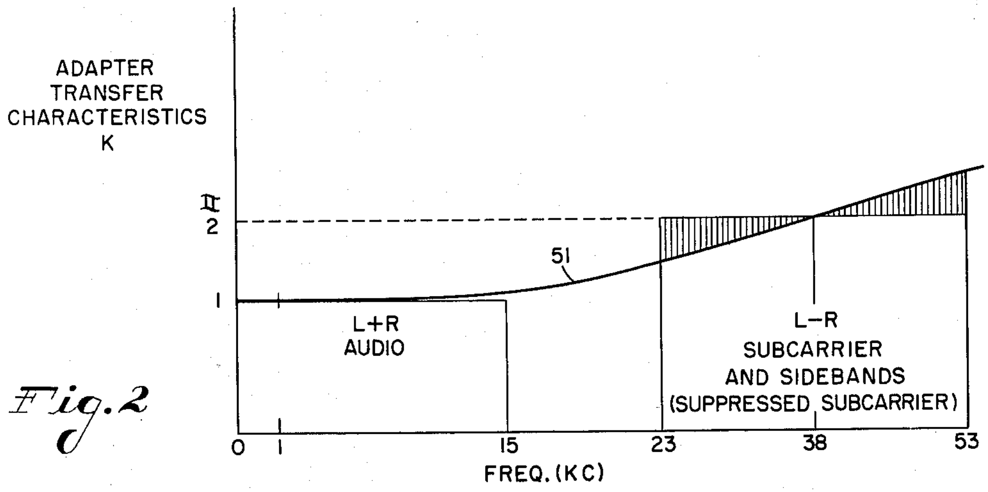
Figure 1A:
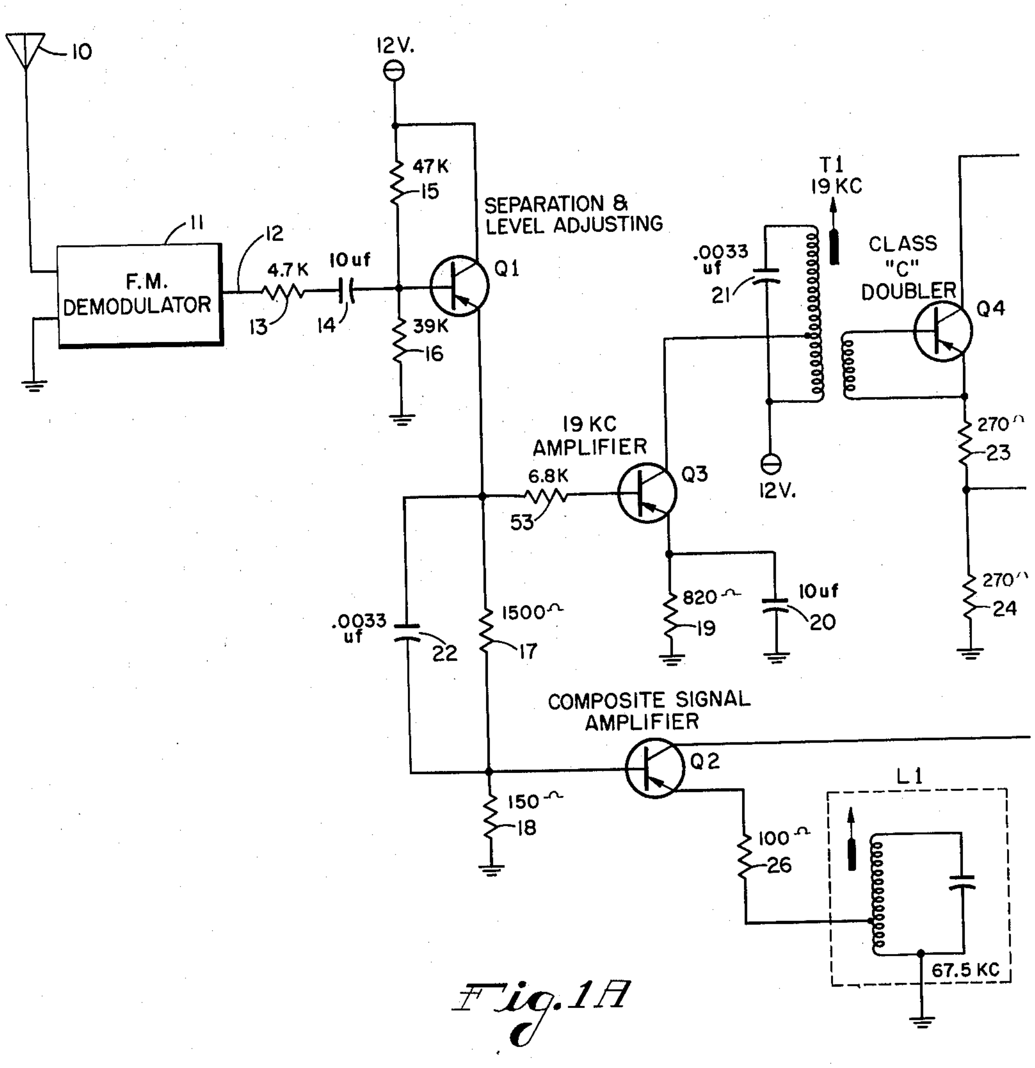

For a better understanding of the invention, reference may be had to the accompanying drawings in which:

FIGS. 1A and 1B contain a schematic diagram of a receiver embodying features of our invention, and FIG. 2 contains a diagram useful in understanding our invention.

Referring now to FIGS. 1A and 1B, the transmitted frequency-modulated carrier is received by antenna 10 and applied to FM demodulator 11. FM demodulator 11 may be any conventional high-quality tuner in which the RF and IF sections of the tuner have a linear phase characteristic within the pass band of the composite signal. In addition, the discriminator should have an output voltage vs. frequency characteristic which is flat to 60 kc.

In accordance with the FCC system, the summation signal, i.e., $L+R$, contains modulating frequencies from 0 to 15 kc. The pilot subcarrier is a 19 kc. signal utilized to demodulate the subcarrier. The difference, i.e., $L-R$, double sideband suppressed carrier AM signal contains upper and lower sidebands 15 kc. each side of 38 kc. which is the frequency of the suppressed carrier. The suppressed carrier is the second harmonic of the pilot carrier and crosses the time axis with a positive slope simultaneously with each crossing of the time axis by the pilot subcarrier. This phasing is necessary for proper demodulation of the difference signal subcarrier.

If the transmitting FM station also happens to be broadcasting a SCA background channel on a 67.5 kc. subcarrier, this channel lies above the $L-R$ subcarrier and varies approximately 8 kc. each side of the 67.5 kc. subcarrier. Therefore, the upper limit of the modulating frequencies of the carrier lies at 75 kc. Thus, in order to reproduce the stereo signal without interference from the SCA background channel, provisions have to be made to reject this subcarrier.

Assuming now that FM demodulator 11 is tuned to a station transmitting stereo, the composite signal on output conductor 12 will contain the $L+R$, the pilot subcarrier and the $L-R$ subcarrier signals. This composite signal is applied to the base of transistor Q1 through resistance 13 and capacitor 14. Transistor Q1 is operating as an emitter-follower and with its associated circuitry serves the dual function of providing the proper signal input levels for transistors Q2 and Q3 and in addition it provides the proper level adjustment of the $L-R$ subcarrier with respect to the $L+R$ audio signal, as described in more detail below.

D.C. bias for transistor Q1 is provided by the bleeder network connected between the $-12$ volt supply and ground. This bleeder network comprises resistors 15 and 16 connected in series between the $-12$ volt supply and ground. The emitter of Q1 is returned to ground through resistances 17 and 18 which are connected in series between the emitter and ground.

Resistor 53 which is connected to the juncture of resistance 17 and the emitter of Q1 provides means for applying the 19 kc. pilot subcarrier to the base of transistor Q3 which is operating as a tuned collector amplifier of the 19 kc. signal. The emitter of transistor Q3 is biased by resistor 19 which is connected between emitter and ground. This emitter is bypassed to the 19 kc. signal by capacitor 20 which is connected in parallel with resistor 19 in order to increase its gain and selectivity. The collector of Q3 is connected to an intermediate point on the primary of transformer T1 which, in conjunction with capacitor 21, forms the tuned collector load for Q3. The 19 kc. amplifier is provided to obtain adequate gain and selectivity to drive the frequency doubler circuit.

Transistor Q4 is driven between base and emitter by the secondary winding of transformer T1. The emitter of Q4 is returned to ground through resistances 23 and 24. The collector circuit of transistor Q4 contains a 38 kc. tuned circuit comprising capacitor 25 connected in parallel with the primary of transformer T2.

A 38 kc. phase-locked signal will appear across the secondary of transformer T2 for demodulating the difference subcarrier.

Referring now to the composite signal channel which includes amplifier Q2, it will be seen that transistor Q2 contains an unbypassed emitter resistor 26 for biasing Q2 without introducing any undesirable phase shifts or frequency response characteristics attributable to the bypassing of resistor 26. Resistor 26 is connected to ground through 67.5 kc. trap L1 which is tuned to the SCA background channel to attenuate this channel prior to the demodulation of the subcarrier by negative feedback.

Since Q2 is D.C. coupled to emitter follower Q1, the base of Q2 must be coupled to the emitter circuit at a correct D.C. potential for biasing Q2 to provide for both linear operation and amplification with a 12 volt collector supply. When Q1 is biased for linear operation with a signal of approximately 4.5 volts peak-to-peak appearing at the output of FM demodulator 11, the emitter of Q1 will be at approximately —4.5 volts D.C. If Q2 were directly coupled to the emitter of Q1, thus applying —4.5 volts D.C. to the base of Q2, resistor 26 would have to be large enough in value to place the operating point of Q2 in the middle of its linear region to accommodate the large peak-to-peak swing of the signal voltage present at the emitter of Q1. This could result in having a net loss in amplifier Q2. Therefore, it is necessary to either change the bias on Q2 or increase the collector supply beyond the —12 volts since it is necessary to develop as large a signal as possible on the emitter of Q1 in order to develop a 19 kc. signal sufficient for driving transistor Q3.

In accordance with our invention, the former was selected since economic considerations render it preferable to work with 12 volt transistors rather than more expensive higher voltage transistors.

The base of Q2 is thus connected to the voltage divider composed of resistances 17 and 18. Therefore, the D.C. bias on the base of Q2 is now low enough and the signals are attenuated enough to allow resistance 26 to be small in comparison to resistance 27. This results in a gain in Q2 that more than overcomes the loss sustained in the divider network.

In order to minimize distortion introduced by utilizing the divider network, the circuit values should be chosen to make it operate as a constant current source. Thus, resistance 17 should be much greater in value than resistance 18 while their total resistance should be much greater than the source impedance at the emitter of Q1. In the preferred embodiment of our invention, the source impedance is of the order of 150 ohms. Consequently, the ratio of the sum of R17+R18 to the source impedance is 11:1 while the ratio of R17 to R18 is 10:1. An increase in the value of resistance 17 would tend to make the divider network more like a constant current source thus reducing distortion. However, an increase in resistance 17 also results in increasing the attenuation of the composite signal available at the base of Q2. However, since it has been found that the above-noted ratios of resistance generates negligible distortion, the ratios are thus selected to apply to the base of Q2 the D.C. bias and signal level necessary for optimum net amplification of the composite signal.

Referring now to FIG. 2, which is a plot of the signal transfer characteristics of the composite signal channel, it would appear that the ideal transfer characteristic would be flat from 0 to 15 kc. and from 23 to 53 kc. with the latter band being at the higher level of $\pi/2$. Obviously a filter network that would even approach this characteristic would be prohibitively expensive especially since such a network will also have to be phase linear over both bands of frequency.

However, we have discovered that the divider network which is introduced to provide the correct bias and signal drive for both Q2 and Q3 also provides a convenient place for adjusting the level of the summation signal with respect to the modulated subcarrier. This can be accomplished by introducing capacitor 22 in parallel with resistance 17. Curve 51 is a plot of the actual transfer characteristic with capacitor 22 connected in parallel with resistance 17. This provides very close to the ideal transfer characteristic in spite of the deviation of curve 51 from the step function between 23 and 53 kc. The slope of curve 51 does not introduce distortion if the resulting network is phase linear over the band of frequencies between 23 and 53 kc. Stated another way, this means that there is no distortion introduced if there is a constant time delay of all frequencies in this range. Consequently, the deficiency in each lower sideband due to it being lower than the step function will be balanced out by the equal amount that the corresponding upper sideband exceeds the ideal step function. Therefore, as far as the difference signal is concerned, the divider network provides the requisite $\pi/2$ step function for adjusting the signal levels.

Thus, the value of capacitor 22 is selected so that the transfer characteristic at 38 kc. will be $\pi/2$ times the transfer characteristic at 1 kc. It has been found to be desirable for practical reasons to select a value for 22 such that the $\pi/2$ level will be exceeded by a small amount in order that sufficient control will be available with normal variations in component tolerances. The difference signal can be attenuated to maintain equality by slightly detuning transformer T2 thus reducing the level of the difference signal upon demodulation.

The composite signal applied to the base of transistor Q2 is amplified and appears across resistance 27 which is connected between the collector and the —12 volt supply.

The modulated subcarrier which appears across resistance 27 is coupled to the common connected emitters of transistors Q6 and Q7 and the point of fixed reference potential, i.e., the —12 volt source. The base emitter junctions of transistors Q6 and Q7 are driven in push-pull by connecting the bases to opposite ends of the center tapped secondary of transformer T2 through resistances 28 and 29. The center tap of the secondary is returned to the common connected emitters through resistance 30.

Stereo-monaural switch Q5 provides means for automatically controlling switches Q6 and Q7 depending upon the presence or absence of a pilot subcarrier in the signal being received at the antenna. When no subcarrier is being received, the 19 kc. amplifier has no input and the class C doubler is not operative thus the fixed bias upon the emitter of Q5 provided by resistors 31 and 32, which are connected between ground and the —12 volt supply, maintains transistor Q5 in its cut-off condition. Consequently, the −12 volts connected to the collector of Q5 is applied through resistance 33 and diode CR3 to the center tap of the secondary of transformer T2. Thus, −12 volts is applied in the absence of a subcarrier signal to the base of both transistors Q6 and Q7. This renders these transistors fully conductive and consequently the monaural signal applied to the base of transistor Q2 will pass through switches Q6 and Q7 and appear across collector load resistors 34 and 35.

If, however, the 19 kc. pilot subcarrier is present, the amplified 19 kc. signal which is applied between the base and emitter of transistor Q4 will generate a phase-locked 38 kc. signal in the secondary circuit of transformer T2. This 38 kc. signal will be applied in phase opposition between the common-connected emitters of transistors Q6 and Q7 and their base circuits through resistors 28 and 29, respectively. Since Q6 and Q7 are linear detectors, the effective reinserted subcarrier must have a large amplitude relative to the amplitude of the composite signal to prevent the introduction of distortion products during demodulation. This is facilitated in accordance with our invention since the 38 kc. subscarrier is applied between base and emitter thus amplifying the 38 kc. signal sufficiently to provide a square wave for demodulation. This is to be contrasted with the usage of diode detectors in which case the 38 kc. signal has to have a great enough magnitude, without amplification, to buck out the modulated subcarrier and still provide the required square wave for demodulation. In the illustrated embodiment, the minimum gain of Q6 and Q7 is in the order of 20 thus reducing the output requirements for the subcarrier regeneration channel by a factor of 20 over that necessary when diode detectors are utilized.

During the operation of the frequency doubler stage, a D.C. voltage appears across resistor 24 and parallel-connected condenser 36. This voltage saturates transistor Q5 thus causing the collector voltage which is applied to a cathode of diode CR3 to go from −12 volts to a point approaching ground potential. This results in back biasing diode CR3 to thus disconnect the −12 volts from the bases of transistors Q6 and Q7 thus placing a positive ground upon the base circuits of these transistors. Thus, transistors Q6 and Q7 are biased to cutoff in the absence of a 38 kc. signal being applied across the secondary of transistor T2. However, since a 38 kc. signal will appear at this point whenever the 19 kc. pilot subcarrier is present, transistors Q6 and Q7 will alternately be driven into conduction. Thus, due to the phase-locked nature of a 38 kc. signal generated across the secondary of transformer T2, switches Q6 and Q7 will alternately sample every half cycle of the incoming modulated subcarrier. Thus, the collector circuits of one will contain a difference signal of one phase while the collector circuit of the other will contain a difference signal of the opposite phase. These signals will be detected by detection filters 40 and 43. However, the two detected difference signals will not appear as such. Since the $L+R$ audio signal applied in common to the emitters of Q6 and Q7 will also appear in both collector circuits, these difference signals of opposite phase will mix upon detection resulting in a signal of 2L being obtained in one collector circuit and a signal of 2R appearing in the other output circuit.

The outputs of detection filters 40 and 43 are then connected through conventional deemphasis filters 41 and 44. The output of the deemphasis filters are then coupled through D.C. blocking condensers 42 and 45 to the output terminals J2 and J3.

While we have shown and described the specific embodiment of our invention, other modifications will readily occur to those skilled in the art. We do not, therefore, desire our invention to be limited to the specific arrangement shown and described, and we intend in the appended claims to cover all modifications within the spirit and scope of our invention.

What is claimed is:

1. Sum and difference stereo apparatus for receiving stereo information contained on a main carrier modulated with a summation signal of first and second audio signals each having frequency components within a frequency range below a given frequency, a pilot frequency greater than said given frequency and a double sideband suppressed subcarrier amplitude modulated with a difference signal of said first and second audio signals, said suppressed subcarrier being a given harmonic of said pilot frequency, said apparatus comprising means for demodulating said main carrier to obtain a composite signal including said summation signal, said pilot frequency and said difference signal-modulated subcarrier double sidebands, harmonic generating means responsive to the application of said pilot frequency thereto for generating said given harmonic thereof, a frequency-responsive voltage divider consisting solely of first and second serially-connected resistances and a capacitance shunting said first resistance, signal translating means for applying said composite signal to said harmonic generating means and across said voltage divider to derive a frequency-responsive attenuated composite signal output across said second resistance, the respective values of said first and second resistances and said capacitance being such that the ratio of the relative amplitude of said signal output at a frequency equal to said given harmonic to the relative amplitude of said signal output at a predetermined frequency within said frequency range is substantially equal to $\pi/2$, stereo demodulator means responsive to the application thereto of said given harmonic and said attenuated signal output for deriving separate first and second audio outputs respectively proportional to said first and second audio signals, means for applying said given harmonic to said stereo demodulator, and means for applying said attenuated signal output to said stereo demodulator.

2. The apparatus defined in claim 1, wherein said given frequency equals fifteen thousand cycles, said pilot frequency equals nineteen thousand cycles, said given harmonic equals thirty-eight thousand cycles and said predetermined frequency equals one thousand cycles.

3. The apparatus defined in claim 1, wherein said stereo demodulator includes first and second transistors each in series with a respective load impedance, means for applying said signal output across each of said first and second transistors and the load impedance thereof, means for applying said given harmonic as an input to said first transistor in phase with the suppressed subcarrier of the attenuated signal output applied thereto and with an amplitude sufficient to saturate said first transistor during alternate half-cycles thereof and to cut off said first transistor during the remaining half-cycles thereof, and means for applying said given harmonic as an input to said second transistor 180° out-of-phase with the suppressed subcarrier of the attenuated signal output applied thereto and with an amplitude sufficient to cut off said second transistor during alternate half-cycles thereof and to saturate said second transistor during the remaining half-cycles thereof, whereby said first and second transistors act as alternatively conducting switches.

4. The apparatus defined in claim 3, wherein monaural information contained on said main carrier modulated solely with a single audio signal having frequency components within said frequency range may be received alternatively to said stereo information, and further including biasing means coupling said harmonic generator to said stereo demodulator for applying a bias potential to both said first and second transistors only in response to the absence of said given harmonic to saturate both said first and second transistors and for removing said bias potential in response to the presence of said given harmonic.

5. The apparatus defined in claim 1, wherein monaural information contained on said main carrier modulated with a double sideband second suppressed subcarrier which in turn is modulated with an audio signal may be received simultaneously with said stereo information, said double sideband second suppressed subcarrier including a frequency range which is above the frequency range of said double sideband first-mentioned subcarrier, and wherein said means for applying said attenuated signal output to said stereo demodulator includes a band reject filter for filtering out said double sideband second suppressed subcarrier.

6. The apparatus defined in claim 1, wherein said signal translating means has a negligible output impedance relative to the total impedance of said voltage divider, whereby said signal translating means appears to be a constant voltage source.

7. The apparatus defined in claim 6, wherein the value of the impedance of said second resistance is a small fraction of the total impedance of said voltage divider at all frequencies included in said stereo information, whereby said attenuated signal output appears to be obtained from a substantially constant current source.

References Cited by the Examiner

UNITED STATES PATENTS

| | | | |
|---|---|---|---|
| 2,851,532 | 9/1958 | Crosby | 179—15 |
| 3,070,662 | 12/1962 | Eilers | 179—15 |
| 3,099,707 | 7/1963 | Dome | 179—15 |
| 3,123,673 | 3/1964 | Stumpers et al. | 179—15 |
| 3,133,993 | 5/1964 | De Vries | 179—15 |

FOREIGN PATENTS

| | | |
|---|---|---|
| 205,255 | 11/1956 | Australia. |

OTHER REFERENCES

De Vries: IRE Transactions on Broadcast and Television Receivers, July 1961, pages 67–72.

Eilers: "FM-Stereo: Time Division Approach," Audio, August 1961, pages 20–22 and 96 relied on.

Von Recklinghausen: IRE Transactions on Broadcast and Television Receivers, November 1961, pages 66–71.

DAVID G. REDINBAUGH, *Primary Examiner.*